Sept. 23, 1969   R. W. BURNS   3,468,642
METHOD OF FABRICATING A FLAP-TYPE WHEEL
Filed Aug. 4, 1966   2 Sheets-Sheet 1
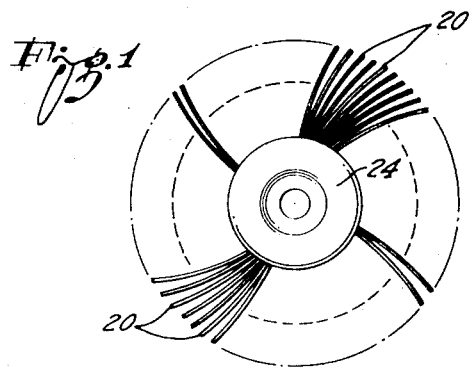
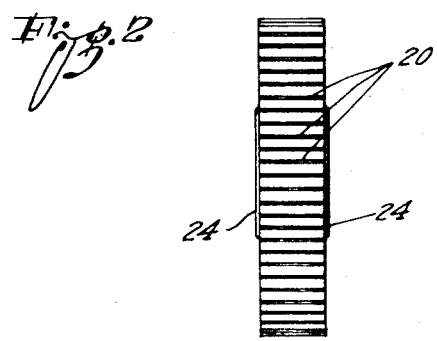
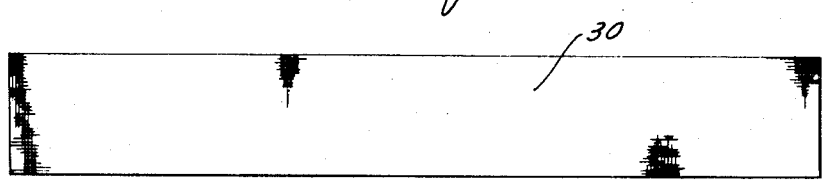
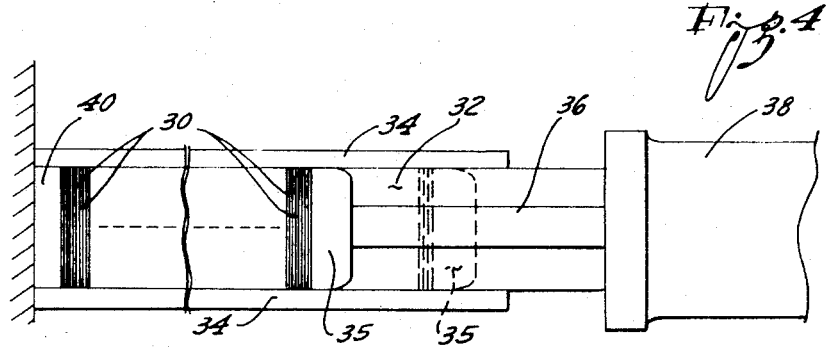
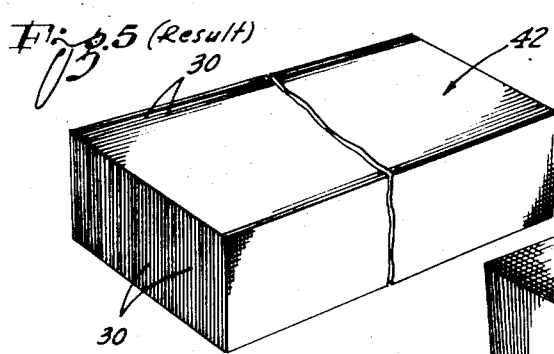
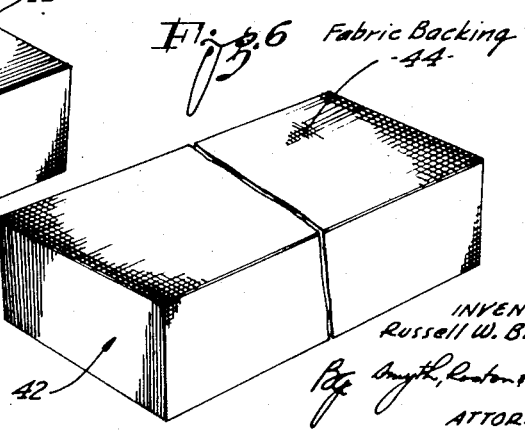
INVENTOR:
Russell W. Burns
ATTORNEYS

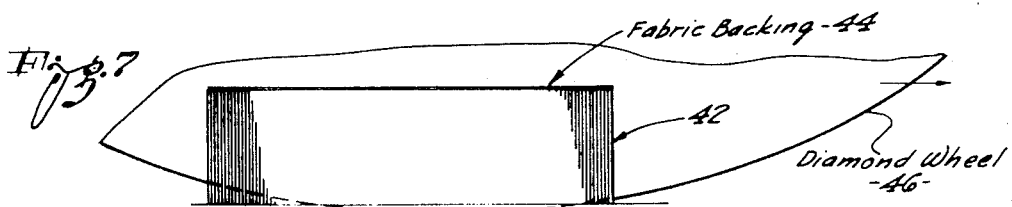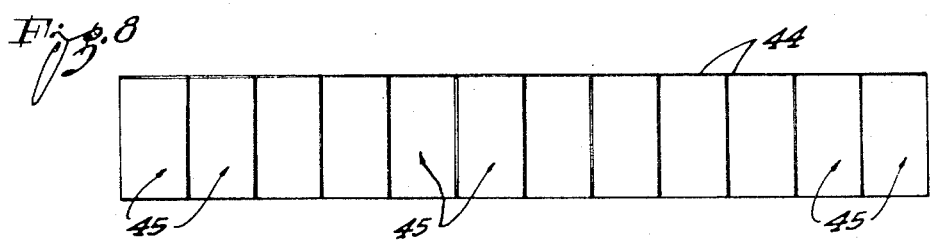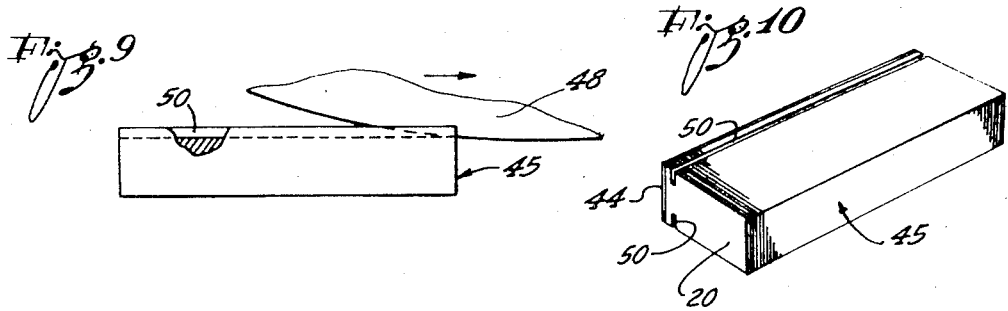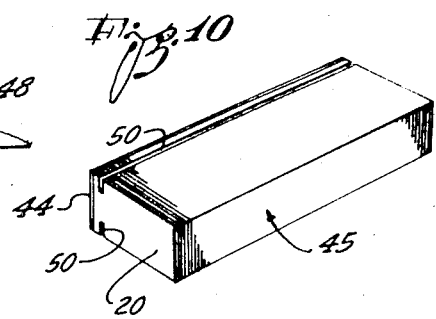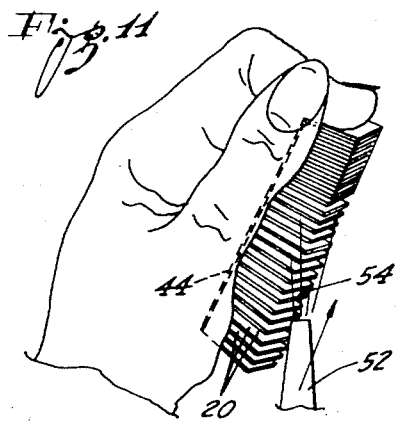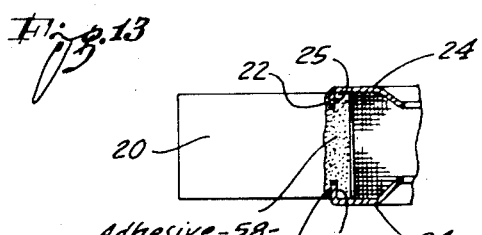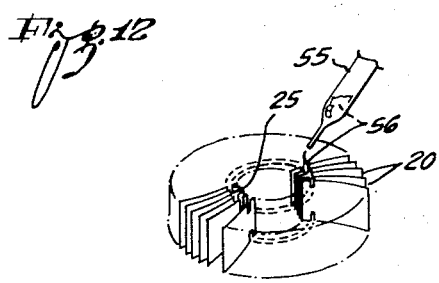

United States Patent Office 3,468,642
Patented Sept. 23, 1969

3,468,642
METHOD OF FABRICATING A FLAP-TYPE WHEEL
Russell W. Burns, Pacific Palisades, Calif., assignor to Merit Products, Inc., Los Angeles, Calif., a corporation of California
Filed Aug. 4, 1966, Ser. No. 570,204
Int. Cl. B24d 13/04
U.S. Cl. 51—297                                    12 Claims

ABSTRACT OF THE DISCLOSURE

The method of fabricating an annular array of leaves with abrasives on one face comprising the steps of arranging a plurality of flexible leaves in a stack with the abrasive faces of the leaves facing in one direction, compacting the stack to cause the abrasive particles of the leaves to penetrate the back of the adjacent leaf thereby forming the stack into a rigid block, applying material to interconnect the end edges of the leaves, forming grooves in opposite side edges of the leaves in the block, loosening the leaves and forming the loose array into a circular configuration.

---

This invention relates to rotary abrasive devices and, more particularly, is directed to a method of fabricating flap-type abrasive devices having annular arrays of flexible abrasive leaves.

In a rotary abrasive device of the type to which the invention pertains, each of the flexible leaves comprises a piece of sheet material, usually a piece of fabric, with abrasive particles bonded on one face of the fabric. For the purpose of assemblying the abrasive leaves to form an abrasive wheel, each of the abrasive leaves has two notches in its opposite edges, respectively, near the base end of the leaf. When the leaves are arranged in an annular array, the notches form concentric circular grooves on the opposite sides of the array. To complete the fabrication of the abrasive wheel, suitable circular reinforcement means are mounted on the opposite sides respectively of the array with the circular reinforcement means seated in the circular grooves for positive anchorage of the inner ends of the abrasive leaves. The circular reinforcement means may comprise a pair of rings or a pair of special hub members. For further anchorage, a suitable adhesive is usually introduced between the leaves at their base ends to bond the base ends into a unitary core.

A typical prior art fabrication procedure includes the steps of: cutting and notching abrasive sheet material to provide the flexible leaves; arranging the leaves compactly face-to-face in a row with the base edges of the leaves uppermost and with the notches of the leaves forming a straight line groove; gluing a fabric strip to the upper surface of the row to interconnect the base edges of the leaves; and arranging interconnected leaves to form an annular array to which the reinforcement means may be assembled.

A basic disadvantage of this prior art procedure is that with the notches formed in the leaves in advance, great care is required to align the notches accurately to form the circular grooves on the opposite sides of the array that are to be engaged by the circular reinforcement means. Since such abrasive wheels are commonly operated at high rates of rotation, high magnitude centrifugal force is created and too often inadequately anchored abrasive leaves pull loose to destroy the unity and efficiency of the device.

The present invention meets the need for assurance of accurate alignment of the notches of the leaves in the finished device. In addition, the present invention affords substantial economies in the mass production of flap-type abrasive wheels.

One discovery is that if a plurality of the described abrasive leaves is arranged face-to-face in a stack with the abrasive faces of the leaves facing in one direction and the stack is subjected to exceedingly high pressure perpendicular to the leaves, say a pressure on the order of 700 p.s.i., the two leaves of each pair of successive leaves of the stack will be interlocked by penetration of the abrasive particles of one leaf of the pair into the back face of the other leaf of the pair, the interlocking of the plurality of leaves being so effective that the stack of leaves is converted into a rigid block that may be freely handled.

The second discovery is that the rigid block may be processed in the manner of a solid block to form straight line grooves therein thereby to cut aligned notches in the leaves of the block. The straight line grooves may be simply burned or cut into the block. Part of the second discovery, however, is that a suitable cutting device such as a rotary diamond saw may be effectively applied to such a compressed block. The diamond saw may be used to cut straight line kerfs in opposite sides of the block and thus provide the leaves of the block with notches in perfect alignment.

An important economical advantage that may be derived from the second discovery is that a plurality of relatively large leaves may be blanked out by means of a punch press, assembled into a stack, and compressed into a rigid block and then the rigid block may be cut into small blocks. Thus if a dozen small blocks each comprising 100 abrasive leaves, are produced in this manner, only 100 blanking operations in a punch press are required instead of 1200 because eleven of the twelve blocks are simply sliced from a larger block. Additional economy resides in the fact that the operation of stacking 100 abrasive leaves is performed only once instead of twelve times.

In the contemplated fabrication procedure a rigid block is processed in some suitable manner to interconnect the base edges of the leaves prior to any application of a rotary saw to the block. The step of interconnecting the base edges of the leaves in a rigid block may be carried out by simply bonding a flexible sheet, such as a sheet of fabric, to the surface of the rigid block that is formed by the base edges of the leaves. After the rotary saw is used the abrasive leaves are loosened to convert the rigid block into an array of leaves interconnected by the base edges. A problem arises, however, because the leaves are so effectively locked together by the compression step that it becomes a tedious and time-consuming task to separate the leaves by hand. A hand operation, moreover, does not loosen the leaves in a uniform manner.

The third discovery taught by the invention is that the leaves of a solid block may be quickly and uniformly loosened from each other by simply applying a high pressure air jet to the block. After the leaves of the block are loosened in this manner to form a loose array of leaves interconnected by their edges, it is a simple matter to bend the loose array to a circular configuration with consequent transformation of the straight line grooves of the rigid block into concentric circular grooves in the circular array. The assembly of the abrasive wheel may then be completed, the final step being to mount the circular reinforcement means on opposite sides of the circular array in engagement with the circular grooves.

The features and advantages of the invention may be understood from the following detailed description and the accompanying drawings.

In the drawings, which are to be regarded as merely illustrative:

FIG. 1 is a side elevation of a flap-type abrasive wheel exemplifying the invention;

FIG. 2 is an end elevation of the abrasive wheel;

FIG. 3 is a plan view of a rectangular leaf that has been blanked out in a punch press for the purpose of the invention, the area of the leaf being multiple times the area of the individual leaves in the abrasive wheel shown in FIGS. 1 and 2;

FIG. 4 is a somewhat diagrammatic plan view showing how a plurality of leaves of the size shown in FIG. 3 may be subjected to high compression perpendicular to the planes of the leaves;

FIG. 5 is a perspective view of a rigid block that results from the compression operation shown in FIG. 4;

FIG. 6 shows a sheet of fabric bonded by an adhesive to one face of the block to interconnect the base edges of the abrasive leaves;

FIG. 7 is a somewhat diagrammatic view showing how a rotary diamond wheel may be employed to saw the rigid block shown in FIG. 6 into a plurality of smaller blocks;

FIG. 8 shows how the block may be cut into twelve small blocks of equal size, each small block comprising leaves of the same size as the leaves in the abrasive wheel shown in FIGS. 1 and 2;

FIG. 9 is a diagrammatic view showing how the diamond wheel may be employed to cut a kerf in a rigid block of leaves;

FIG. 10 is a perspective view of one of the smaller blocks with two straight line kerfs cut therein;

FIG. 11 is a perspective view showing how a jet of compressed air may be employed to loosen the leaves of the block shown in FIG. 10 thereby to transform the block into a loose array of abrasive leaves interconnected at their base edges;

FIG. 12 is a perspective view showing how the loose array shown in FIG. 11 may be bent to circular configuration with consequent transformation of the straight line grooves of the block shown in FIG. 10 into concentric circular grooves, the view further showing how a suitable adhesive may be deposited in the circular grooves;

FIG. 13 is a sectional view of the finished abrasive wheel showing how circular reinforcement means in the form of two opposite hub members may engage the two circular grooves and further showing how the inner end portions of the abrasive leaves may be adhesively bonded together;

FIG. 14 is a plan view of an abrasive leaf that is dimensioned for the fabrication of a specific flap-type abrasive wheel differing in size from the abrasive wheel of FIGS. 1 and 2; and FIG. 15 is a diagrammatic plan view similar to FIG. 4 showing how a stack of leaves of the size shown in FIG. 14 may be compressed to form a rigid block in preparation for the fabrication of a flap-type abrasive wheel.

FIGS. 1 and 2 show, by way of example, a rotary abrasive wheel that may be produced in accord with the teachings of the invention. The rotary abrasive wheel is of the familiar flap-type having an annular array of flexible abrasive leaves 20, each of which may be a piece of fabric with abrasive particles bonded to one face of the fabric. As indicated in FIG. 13 each of the flexible abrasive leaves 20 is formed with notches in its opposite side edges, respectively, which notches form concentric grooves 22 on opposite sides of the wheel.

It is contemplated that a suitable circular reinforcement means will be seated in each of the circular grooves 22 to lend strength to the abrasive wheel and to retain the individual leaves in their assembled positions. Various circular reinforcement devices, including simple rings, may be employed for this purpose in various practices of the invention. In this instance the circular reinforcement means comprises a pair of opposite hub members 24 which, as shown in FIG. 13, are formed with circular flanges 25 shaped and dimensioned to seat in the circular grooves 22 for the purpose of positively and effectively anchoring the base ends of the leaves to resist high magnitude centrifugal force.

In the first practice of the invention now to be described, it is assumed that the individual leaves 20 of the abrasive wheel shown in FIGS. 1, 2 and 13 are of relatively small size, for example approximately ½" by 1⅛". The first step in the preferred fabrication procedure is to provide a plurality of rectangular abrasive sheets such as the abrasive sheet 30 shown in FIG. 3. The abrasive sheet 30 is of multiple times the desired dimension of the individual abrasive leaves 20. Thus, if the size of the individual abrasive leaves 20 is approximately ½" by 1⅛", the larger abrasive sheet 30 may be approximately 1⅛" by 6", i.e. twelve times the dimension of the individual leaves 20.

FIG. 4 shows how a plurality of sheets 30, say approximately 100 sheets, may be assembled in face-to-face relation in a stack with the abrasive faces of the sheets facing in one direction. The stack is shown in a jig which provides a flat support surface 32 and two opposite guides 34 to confine the stack. A rectangular pressure head 35 mounted on a piston rod 36 of a hydraulic ram 38 places the stack of abrasive sheets under compression against a backing block 40. As heretofore stated, the pressure applied to the stack of sheets by the hydraulic ram may be on the order of 700 p.s.i. The exceedingly high pressure to which the stack of sheets is subjected converts the stack of sheets into the rigid block 42 shown in FIG. 5, the leaves of the block being interlocked by penetration of the abrasive particles into the back faces of the leaves.

The next step is to apply suitable material to one surface of the block 42 to interconnect base edges of the individual sheets 30. For this purpose a suitable adhesive may be applied to the surface of the rigid block to form a flexible adhesive web interconnecting the edges of the sheets. In the preferred practice of the invention, however, adhesive is employed to bond a flexible sheet 44 to the surface of the block as shown in FIG. 6. The sheet 44 may be a fabric sheet and a white vinyl adhesive may be employed to bond the fabric to the block.

The next step is to employ a suitable cutting device such as a diamond wheel or saw to subdivide the block shown in FIG. 6 into a plurality of smaller blocks. In this example, the block 42 in FIG. 6 is subdivided into twelve equal blocks 45 shown in FIG. 8, each of the smaller blocks comprising the same number of relatively small leaves 20 as the number of leaves or sheets in the large block 42, the dimension of the smaller leaves being approximately ½" by 1⅛". To subdivide the large block, a circular diamond saw 48 may be employed in the manner indicated in FIG. 7, the saw cutting through the surface that is covered by the fabric 44.

FIG. 9 shows how the diamond saw 48 may be employed to cut a straight line kerf 50 in a small block 45. FIG. 10 shows how the small block is formed with two kerfs 40 near the base edges of the leaves 20.

The next step is to loosen the leaves of each small block 45 thereby to convert the rigid block into a loose array of leaves interconnected by the fabric 44. As indicated in FIG. 11 this step may be carried out by employing a nozzle 52, say a ⅜" nozzle, to direct a jet 54 of compressed air against the edges of the leaves 46, the air being supplied by a high pressure source, for example an air compressor creating a supply of air at 150 p.s.i.

As illustrated in FIG. 12, the next step in the preferred fabrication procedure consists of placing the loose array of interconnected leaves on a flat support surface and forming the array into circular configuration thereby converting the straight line kerfs into the previously mentioned circular grooves 25 on opposite sides of the circular array. The hub members 24 may then be assembled to the opposite faces of the circular array to complete the fabrication of an abrasive wheel shown in FIGS. 1, 2 and 13.

In the preferred practice of the invention, a suitable applicator such as an eyedropper 55 (FIG. 12) is employed to deposit an epoxy adhesive 56 in the circular grooves 25 on opposite sides of the circular array in preparation for assembling the hub members 24. It is contemplated that the epoxy 56 will be of relatively low viscosity to penetrate readily into the interior of the array by capillary attraction. Since the abrasive leaves 20 converge together at their base ends, the capillary attraction is effective only at the base ends and results in layers of epoxy 58 between the successive base ends of the leaves 20 to provide the circular array with a solid annular core. Before the epoxy cures, the hub members 24 are mounted on the opposite faces of the circular array so that the cured epoxy serves not only to interconnect the base portions of the abrasive leaves 20 but also serves to bond the hub members 24 to the circular array.

It is apparent that an abrasive wheel of the character described may be fabricated without subdividing a rigid block. For example, in FIGS. 14 and 15 illustrating a second practice of the invention, FIG. 14 shows an abrasive leaf 60 which has been stamped out by a punch press, or the like, the leaf being of a size desired for a specific flap-type abrasive wheel. As indicated diagrammatically in FIG. 15, a required number of abrasive leaves 60 is formed into a stack and then the stack is placed under compression by the same apparatus as shown in FIG. 4 to produce a rigid block of interlocked leaves. The resulting rigid block may then be further processed in the manner heretofore described to produce a flap-type abrasive wheel. Thus, one surface of the rigid block produced by the operation shown in FIG. 15 may be covered with fabric as shown in FIG. 6 and then two kerfs may be formed in the block in the manner indicated in FIGS. 9 and 10. After the two kerfs are formed the leaves of the block may be loosened by an air jet in the manner illustrated by FIG. 11, and then the fabrication of the abrasive wheel may be completed in the previously described manner indicated by FIGS. 12 and 13.

The second described practice of the invention does not afford the economies in the blanking operation that are achieved by the first practice of the invention, but the second practice of the invention meets the basic object of the invention which is to fabricate a flap-type wheel economically and efficiently with precise alignment of the notches in the opposite edges of the leaves.

My description in specific detail of the selected practices of the invention will suggest various changes, substitutions and other departures from my disclosure within the spirit and scope of the appended claims.

I claim:

1. A method of fabricating an annular array of abrasive leaves with opposite side edges and end edges and with abrasive particles bonded to one face of the leaves and with notches in the opposite side edges of the leaves near the inner ends thereof forming circular grooves in the opposite sides of the array to seat circular reinforcement means, characterized by the steps of:
   providing a plurality of leaves of flexible sheet material without notches therein [and with abrasive particles bonded to one face of each leaf];
   arranging the plurality of leaves in a stack with the abrasive faces of the leaves facing in one direction;
   subjecting the stack to high compression in a direction substantially perpendicular to the leaves to cause successive leaves of the stack to adhere to one another by penetration of the abrasive particles of each leaf into the back face of the adjacent leaf thereby transforming the stack of leaves into a rigid block;
   applying material to the block to interconnect the end edges of the leaves;
   forming straight line grooves in opposite side edges of the leaves in the block at positions displaced from the end edges and near said end edges of the leaves;
   loosening the leaves from face to face adherence to each other to transform the block into a loose array of leaves interconnected at their inner ends; and
   forming the loose array into circular configuration thereby transforming the straight line grooves into circular grooves on opposite faces of the circular array.

2. A method as set forth in claim 1 in which the step of loosening the leaves from face to face adherence to each other is carried out by directing an air jet against the block.

3. A method as set forth in claim 1 in which the step of applying material to [one surface of] the block to interconnect end edges of the leaves includes the step of applying adhesive to the block.

4. A method of fabricating an annular array of abrasive leaves with opposite side edges and with end edges and with abrasive particles bonded to one face of the leaves and with notches in the opposite side edges of the leaves near the inner ends thereof forming circular grooves in the opposite sides of the array to seat circular reinforcement means, characterized by the steps of:
   providing a plurality of leaves of flexible sheet material without notches therein;
   arranging the plurality of leaves in a stack with the abrasive faces of the leaves facing in one direction;
   subjecting the stack to high compression in a direction substantially perpendicular to the leaves to cause successive leaves of the stack to adhere to one another by penetration of the abrasive particles of each leaf into the back face of the adjacent leaf thereby transforming the stack of leaves into a rigid block;
   applying material to the block to interconnect the end edges of the leaves;
   cutting straight line kerfs in the rigid block defined by the leaves to form aligned notches in the opposite side edges of the leaves near said end edges of the leaves;
   loosening the leaves from face to face adherence to each other to transform the block into a loose array of leaves interconnected at their inner ends; and
   forming the loose array into circular configuration thereby transforming the straight line grooves into circular grooves on opposite faces of the circular array.

5. A method as set forth in claim 4 in which a circular diamond wheel is employed to cut the kerfs.

6. A method of fabricating an abrasive flap-type wheel having an annular array of abrasive leaves with opposite side edges and end edges and with notches in the opposite side edges of the leaves near the inner ends thereof and with circular reinforcement means engaging the notches and with abrasive particles bonded to one face of the leaves, characterized by the steps of:
   providing a plurality of leaves of flexible sheet material without notches therein;
   arranging the plurality of leaves in a stack with the abrasive faces of the leaves facing in one direction;
   subjecting the stack to a high compression in a direction substantially perpendicular to the leaves to cause successive leaves of the stack to adhere together by penetration of the particles of each leaf into the back face of the adjacent leaf thereby transforming the stack of leaves into a rigid block;
   applying material to the block to interconnect the end edges of the leaves;
   cutting straight line kerfs in opposite faces of the block defined by the leaves to form aligned notches in the opposite side edges of the leaves near said end edges of the leaves;
   loosening the leaves from face to face adherence to each other to transform the block into a loose array of leaves interconnected at their inner ends;
   forming the loose array into a circular configuration thereby transforming the straight line kerfs of the block into circular grooves on opposite faces of the circular array; and
   applying a low viscosity adhesive to the circular array in the region of said circular grooves of the leaves to cause the adhesive to penetrate the array and bond the inner end portions of the leaves together.

7. A method as set forth in claim 6 in which the step of applying material to the array includes applying adhesive to said end edges for forming a flexible adhesive web interconnecting th eend edges of the leaves.

8. A method as set forth in claim 6 in which the step of loosening the leaves from face to face adherence to each other is carried out by directing an air jet against edges of the leaves in the block.

9. A method of fabricating annular arrays of abrasive leaves with opposite side edges and with end edges and with abrasive particles bonded to one face of the leaves and with notches in the opposite side edges of the leaves near the inner ends thereof forming circular grooves in the opposite sides of the arrays to seat circular reinforcement means, including an annular array of leaves of a given size, characterized by the steps of:

provinding a plurality of flexible leaves larger than said given size without notches therein;

arranging the plurality of leaves in a stack with the abrasive faces of the leaves facing in one direction;

subjecting the stack to high compression in a direction substantially perpendicular to the leaves to cause successive leaves in the stack to adhere together by penetration of the abrasive particles of each leaf into the back face of the adjacent leaf thereby forming the stack into a relatively rigid block;

applying material to the relatively rigid block to interconnect the end edges of the leaves;

cutting through the rigid block to divide the block into a plurality of smaller blocks having leaves interconnected at their inner edges, with at least one block of leaves of said given size;

forming straight line grooves in the opposite side edges of the leaves in each of said smaller blocks;

loosening the leaves from face to face adherence to each other in said smaller blocks to transform the smaller blocks into loose arrays of leaves interconnected at their end edges; and forming the loose arrays into circular arrays thereby transforming the straight line grooves into circular grooves.

10. A method as set forth in claim 9 in which the step of forming straight line grooves in said smaller blocks is carried out by applying a circular saw to the opposite side edges of the leaves in smaller blocks.

11. A method as set forth in claim 9 in which the step of loosening the leaves from face to face adherence to each other in said smaller blocks is carried out by directing an air jet against edges of the leaves in the smaller blocks.

12. The method as set forth in claim 3 including the further step of applying flexible sheet material to the adhesive.

References Cited

UNITED STATES PATENTS

| | | | |
|---|---|---|---|
| 2,796,337 | 6/1957 | Block | 51—293 |
| 2,991,165 | 7/1961 | Meyer et al. | 51—297 |
| 3,116,575 | 1/1964 | Block | 51—337 |
| 3,220,810 | 11/1965 | Block | 51—293 |
| 3,241,267 | 3/1966 | Block et al. | 51—336 |
| 3,294,502 | 12/1966 | Schaffner | 51—293 |

DONALD J. ARNOLD, Primary Examiner

U.S. Cl. X.R.

51—293, 337